United States Patent [19]

Boag

[11] Patent Number: 4,861,070
[45] Date of Patent: Aug. 29, 1989

[54] SEATBELT GUIDE RING WITH ANTI-TWIST FEATURE

[75] Inventor: John Boag, Ferndale, Mich.

[73] Assignee: Ford Motor Company, Dearborn, Mich.

[21] Appl. No.: 125,978

[22] Filed: Nov. 27, 1987

[51] Int. Cl.4 .............................................. B60R 22/20
[52] U.S. Cl. ................................ 280/808; 24/265 AL
[58] Field of Search ............... 280/801, 808; 297/468, 297/483; 24/265 AL, 265 BC, 198, 163 R

[56] References Cited

U.S. PATENT DOCUMENTS

| | | | |
|---|---|---|---|
| 4,341,359 | 7/1982 | Jahn | 280/808 |
| 4,378,947 | 4/1983 | Föhl | 280/808 |
| 4,642,853 | 2/1987 | Plesniarski et al. | 24/198 |

FOREIGN PATENT DOCUMENTS

| | | | |
|---|---|---|---|
| 2813533 | 10/1979 | Fed. Rep. of Germany | 280/801 |
| 3505928 | 8/1986 | Fed. Rep. of Germany | 280/808 |
| 1280153 | 7/1972 | United Kingdom | 24/265 AL |

Primary Examiner—Charles A. Marmor
Assistant Examiner—Karin Tyson
Attorney, Agent, or Firm—Daniel M. Stock; Clifford L. Sadler

[57] ABSTRACT

An improved guide ring assembly consists of a guide member which is adapted to be pivotally mounted to a portion of an automotive vehicle and a plastic cover member which is snap fit over the guide member, the guide member and cover member cooperate to define first and second anti-twist elements for preventing or roping of a seat belt as it is drawn from its vehicle occupant restraining position to the retractor from which it has been paid out.

27 Claims, 1 Drawing Sheet

SEATBELT GUIDE RING WITH ANTI-TWIST FEATURE

BACKGROUND OF THE INVENTION

The present invention relates generally to guide rings for automotive safety belt systems and more particularly to improvements in the anti-twist features for such guide rings.

DESCRIPTION OF THE PRIOR ART

To enhance the convenient use of automotive seat belts, it is highly desirable to prevent the twisting or roping of the belt upon its retraction into the seatbelt retractor after use. A twisted belt tends to not fully retract easily and may make its subsequent deployment in the occupant restraining position difficult and time consuming. In seat belt systems for restraining front seat occupants in automobiles, a guide ring, commonly referred to as a "D" ring, is normally positioned at or near the roof or supporting pillar positioned just rearward of the occupants. The seat belt is fed through this ring from the retractor to the seat belt's tongue or other locking element. This guide ring is used both to properly position the shoulder belt across the front seat occupant and to guide the passage of the belt during deployment and retraction. Great design attention has been given to the design of the slot in the guide ring in an attempt to prevent the twisting of the belt during restraining use. Exemplary of such slot designs is that shown in U.S. Pat. No. 4,023,826 to Kokubo et al in which a slot is profiled to resist the tendency of the belt to twist and jam under certain side loads. Another approach to providing an anti-twist feature is that shown in U.S. Pat. No. 4,142,274 to Scholz et al in which a simple slot is overlaid with a portion of the guide ring.

While approaches such as the foregoing have been effective in many cases in which the belt is partially side loaded in use, the desire to improve the inhibition of twisting during unloaded seat belt retraction after use is a continuing design goal.

SUMMARY OF THE INVENTION

It is accordingly an object of the present invention to provide an improved guide ring assembly for an automotive seat belt which inhibits the twisting of the seat belt during retraction in an improved manner.

It is a further object to provide such a guide ring assembly which is readily economically producible and easily assembled into an automotive vehicle.

According to one feature of the present invention, a guide ring assembly is provided which includes primary and secondary anti-twist means for operative engagement with the seat belt.

According to another feature of the present invention, the primary anti-twist means includes a slot formed through the body of the guide ring, positioned facing the seat belt assembly retractor and receiving the belt.

According to another feature, the secondary anti-twist means consists of a simple plastic cover member snap-fit connected to the body of the guide ring and having a portion of its outer surface disposed adjacent the path of the seat belt as it exits the slot of the primary anti-twist means.

BRIEF DESCRIPTION OF THE DRAWINGS

These and other objects and features will be apparent to those skilled in the automotive seat belt arts upon reading the following description with reference to the accompanying drawing in which.

DESCRIPTION OF THE PREFERRED EMBODIMENT

Figure 1:
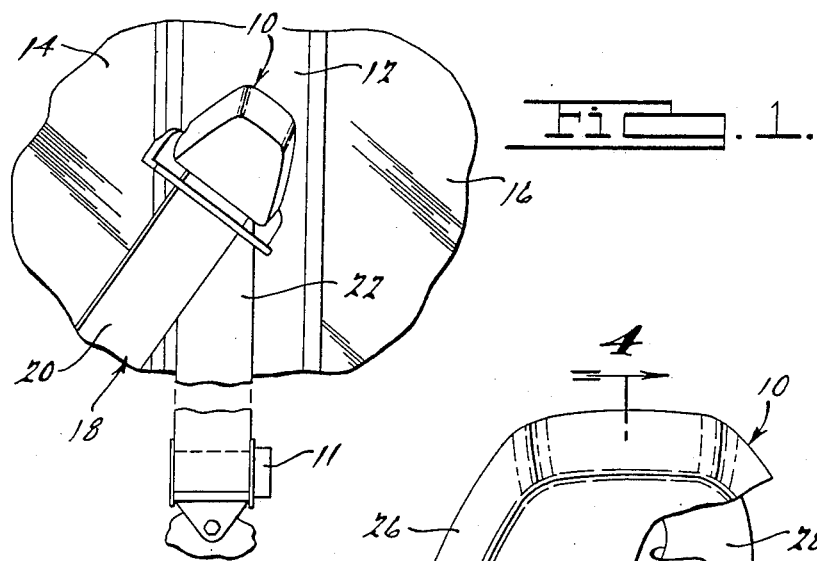
FIG. 1 is a view of a portion of an automotive front seat belt assembly illustrating the guide ring assembly of the present invention installed on a vehicle support pillar.
Figure 2:
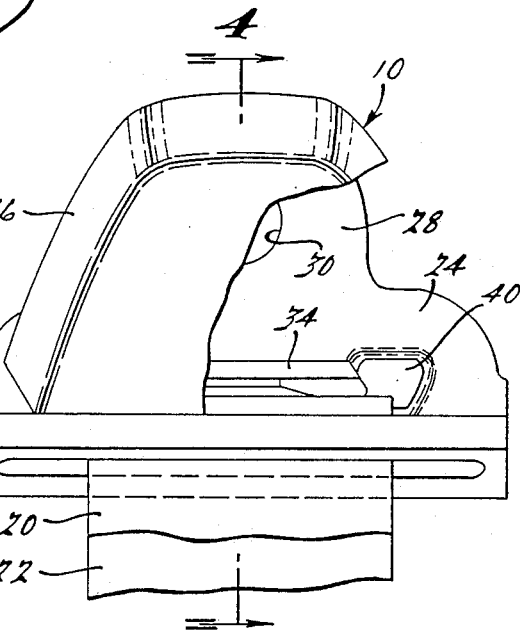
FIG. 2 is a front view of the invention guide ring assembly, certain portions broken away for clarity.

Turning now to the drawings, and particularly to FIG. 1 thereof. A guide ring assembly 10 is illustrated as being mounted on an interior portion of a pillar 12 of an automobile, such as the central pillar usually referred to as the "B" pillar of the automobile between front and rear panes of glass 14, 16, respectively. When the seat belt system, the remainder of which is not shown, is functioning to restrain a front seat occupant, the seat belt 18 of the system has a portion 20 extending forwardly to restrain the occupant and a portion 22 extending adjacent the pillar 12 to a floor mounted retractor assembly, shown schematically at 11, from which it has been paid out, usually through agency of a spring loaded spool. After release of the front portion 20 from the occupant, the retractor assembly 11 serves to wind up the belt 18; and the guide ring assembly 22 assumes a more nearly vertical position as is illustrated in FIG. 2. Because of the flexibility of the belt 20, it is during this operation that the twisting or roping of the belt 18 may occur.

Figure 3:
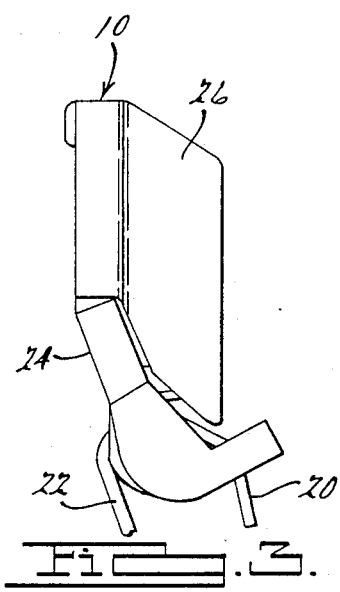
FIG. 3 is a side view of the guide ring assembly of FIG. 2.
Figure 4:
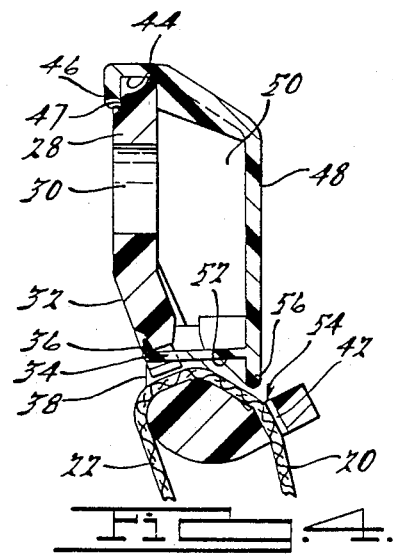
FIG. 4 is a cross-sectional view taken along lines IV—IV of FIG. 2.

The efficacy of the guide ring 10 of the present invention to prevent this twisting or roping can be best appreciated by reference to FIGS. 2-4. The guide ring assembly 10 of the present invention consists essentially of a body 24 and a cover member 26. The body 24 includes a mounting portion 28 through which is formed an aperture 30 for receiving a fastener, not shown, by which the guide ring assembly 10 may be fixed for pivotal movement to the pillar 12. Below the mounting portion 28 extends a guide portion 32 at an angle extending away from the face of the pillar 12 toward the interior of the automobile. A plurality of slots are formed through the guide portion 32 of the body 24. Uppermost as viewed in FIG. 4 is a generally horizontally extending retaining slot 34 for receiving a catch portion 36 of the cover member 26. Next below, is a profiled slot 38 which is formed as a substantially horizontal slot having enlarged end portions, as shown at 40 in FIG. 2. The enlarged portions 40 guide and restrain the movement of the lateral edges of the belt 20 when it is in the restraining position, as shown in FIG. 1, to resist twisting or roping of the belt 20 as its path changes from vertical as it leaves the retractor assembly 11 to diagonal as it crosses the front seat occupant of the automobile. The remaining lowermost slot 42 formed through guide portion 32 of the body 24 provides the primary means for inhibiting twisting of the belt 20 when the belt is doffed by the vehicle occupant.

The cover member 26 is preferably formed as a molded plastic part of cup-like configuration. It has a retaining pocket 44 formed interiorly of its upper surface including a wall portion 46 which engages a shoulder 47 formed at the upper end of the mounting portion 28 of the body 24. Spaced inwardly from the mounting portion 28, the inner wall 48 of the cover member defines with the mounting portion 28 a space 50 for enclosing the mounting fastener. At the lower terminus of the wall 48, a leg 52 terminating in the catch 36 extends perpendicularly for insertion into the retaining slot 34.

OPERATION OF THE PREFERRED EMBODIMENT

When an automotive vehicle occupant releases his/her seat belt 18 from its occupant restraining position, the portion 22 adjacent the pillar 12 moves toward the retractor assembly 11, typically under the influence of a conventional spring-loaded spool mechanism. The portion 20 of the belt 18 extended toward the occupant passes through the slot 42 which is closely sized to the thickness of the belt 18, as may be seen in FIG. 4, to resist the tendency to twist. The slot 42 is arranged to be alignable in the path of the seat belt 18 as it is drawn to the retractor assembly 11. Under the modest loads imposed by a typical seat belt retractor assembly 11, the smoothing action of the slot 42 is in most cases sufficient to prevent twisting. If, however, a portion of twisted belt exits the upper terminus 54 of the slot 42, contact with the lower edge 56 of the cover member 26 serves as a secondary anti-twist means will remove the twist from the belt since the edge 56 closely overlies the exit 54 of the slot 42 and lies in the path of the belt 18 as it is pulled toward the retractor assembly 11. The edge 56 is preferably sized to extend to a width greater than that of the seat belt 18 as may be seen in FIG. 2.

While only one embodiment of the guide ring assembly of the present invention has been described, others may be possible without departing from the scope of the following claims.

I claim:

1. A guide ring assembly for controlling the retracting movement of an automobile seat belt from its occupant restraining position to its stored position in a seat belt retractor mounted in the body of the automobile, the guide ring assembly:
   a body member including a mounting portion for pivotally mounting the body member on an interior portion of the automobile and a guide portion having a first slot formed therethrough substantially alignable with the path of the seat belt to the retractor and having an entrance receiving the seat belt and an exit through which the seat belt passes to the retractor as it retracts from the occupant restraining position, the slot being closely sized to the thickness of the seat belt; and
   a cover member carried on the body in overlying fashion and having an edge portion positioned adjacent to and overlying only the exit of the slot.

2. A guide ring assembly as defined in claim 1 wherein the cover member is formed from plastic.

3. A guide ring assembly as defined in claim 1 wherein the edge portion extends laterally substantially over the width of the first slot.

4. A guide ring assembly for controlling movement of the seat belt of an automobile from its occupant restraining position to its stored position under the influence of a seat belt retractor, the guide ring assembly comprising:
   a body member mounted for pivotal movement on an interior portion of the body of the automobile and including means for receiving the seat belt for passage therethrough;
   a cup-like cover member carried in overlying fashion on the body member;
   primary anti-twist means formed integrally with the body member for smoothing the seat belt during passage through the guide ring assembly; and
   secondary anti-twist means formed integrally with the cover member for smoothing the seat belt and positioned in the path of the seat belt from the primary anti-twist means.

5. A guide ring assembly as defined in claim 4 wherein the cover member is formed from plastic.

6. A guide ring assembly as defined in claim 4 wherein the primary anti-twist means comprises means defining a slot through the body member substantially alignable with the path of the seat belt to the retractor, the slot being closely sized to the thickness of the seat belt and wherein the secondary anti-twist means comprises an edge portion formed on the cover member in juxtaposition with the slot.

7. A guide ring assembly as defined in claim 6 wherein the edge portion extends laterally substantially over the width of the first slot.

8. A guide ring assembly as defined in claim 6 and further comprising:
   a leg integrally formed with a wall of the cover member and extending toward the body member; and
   a second slot formed through the body member guide portion adjacent the first slot for receiving the leg in snap fit relationship.

9. A guide ring assembly as defined in claim 8 and further comprising a catch portion formed proximate the free end of the leg.

10. A guide ring assembly as defined in claim 8 wherein the cover member is formed from plastic.

11. A guide ring assembly as defined in claim 8 wherein the edge portion extends laterally substantially over the width of the first slot.

12. A guide ring assembly as defined in claim 8 wherein the body member further includes a profiled slot having enlarged end openings formed through a portion of the body member spaced from the first slot intermediate first slot and the retractor.

13. A guide ring assembly for controlling the retracting movement of an automobile seat belt from its occupant restraining position to its stored position in a seat belt retractor mounted in the body of the automobile, the guide ring assembly comprising:
   a body member including a mounting portion for pivotally mounting the body member on an interior portion of the automobile and a guide portion having a first slot formed therethrough substantially alignable with the path of the seat belt to the retractor and having an entrance receiving the seat belt and an exit through which the seat belt passes to the retractor as it retracts from the occupant restraining position, the slot being closely sized to the thickness of the seat belt; and
   a cover member snap fit on the body in overlying fashion and having an edge portion positioned adjacent to and overlying the exit of the slot.

14. A guide ring assembly as defined in claim 13 and further comprising:
   a leg integrally formed with a wall of the cover member and extending toward the body member; and a second slot formed through the body member guide portion adjacent the first slot for receiving the leg in snap fit relationship.

15. A guide ring assembly as defined in claim 13 wherein the cover member is formed from plastic.

16. A guide ring assembly as defined in claim 13 wherein the edge portion extends laterally substantially over the width of the first slot.

17. A guide ring assembly as defined in claim 14 and further comprising a catch portion formed proximate the free end of the leg.

18. A guide ring assembly for controlling the retracting movement of an automobile seat belt from its occupant restraining position to its stored position in the seat belt retractor mounted in the body of the automobile, the guide ring assembly comprising:
- a body member including a mounting portion for pivotally mounting the body member on an interior portion of the automobile and a guide portion having a first slot formed therethrough substantially alignable with the path of the seat belt to the retractor and having an entrance receiving the seat belt and an exit through which the seat belt passes to the retractor as it retracts from the occupant restraining position, the slot being closely sized to the thickness of the seat belt;
- a cover member carried on the body in overlying fashion and having an edge portion positioned adjacent to and overlying the exit of the slot;
- a leg integrally formed with a wall of the cover member and extending toward the body member;
- a retaining pocket formed in the cover member;
- a shoulder formed on the body member mounting portion engageable with the retaining pocket; and
- a second slot formed through the body member guide portion adjacent the first slot for receiving the leg portion in snap fit relationship.

19. A guide ring assembly as defined in claim 18 wherein the cover member is formed from plastic.

20. A guide ring assembly as defined in claim 18 wherein the edge portion extends laterally substantially over the width of the first slot.

21. A guide ring assembly as defined in claim 18 wherein the body member further includes a profiled slot having enlarged end openings formed through a portion of the body member spaced from the first slot intermediate and first slot and the retractor.

22. A guide ring assembly for controlling the retracting movement of an automobile seat belt from its occupant restraining position to its stored position in a seat belt retractor mounted in the body of the automobile, the guide ring assembly comprising:
- a body member including a mounting portion for pivotally mounting the body member on an interior portion of the automobile and a guide portion having a first slot formed therethrough substantially alignable with the path of the seat belt to the retractor and having an entrance receiving the seat belt and an exit through which the seat belt passes to the retractor as it retracts from the occupant restraining position, the slot being closely sized to the thickness of the seat belt and a profiled slot having enlarged end openings formed through a portion of the body member spaced from the first slot and intermediate the first slot and the retractor; and
- a cover member snap fit on the body in overlying fashion and having an edge portion positioned adjacent the exit of the first slot.

23. A guide ring assembly as defined in claim 22 wherein the cover member is formed from plastic.

24. A guide ring assembly as defined in claim 22 wherein the edge portion extends laterally substantially over the width of the first slot.

25. In a seat belt system for an automobile of the type having a guide ring assembly pivotally mounted on a portion of the body of the automobile above and behind a seated occupant thereof for guiding the sliding movement of the seat belt from positions adjacent the occupant responsive to forces imposed by a retractor assembly mounted substantially vertically beneath the guide ring assembly on another portion of the vehicle, an improved guide ring assembly comprising:
- a body member including a mounting portion for pivotally mounting the body member on an interior portion of the automobile and a guide portion having a first slot formed therethrough substantially alignable with the path of the seat belt to the retractor and having an entrance receiving the seat belt and an exit through which the seat belt passes to the retractor as it retracts from the occupant restraining position, the slot being closely sized to the thickness of the seat belt;
- a cover member carried on the body in overlying fashion and having an edge portion positioned adjacent to and overlying the exit of the slot;
- a leg integrally formed with a wall of the cover member and extending toward the body member;
- a retaining pocket formed in the cover member;
- a shoulder formed on the body member mounting portion engageable with the retaining pocket; and
- a second slot formed through the body member guide portion adjacent the first slot for receiving the leg in snap fit relationship.

26. In a seat belt system for an automobile of the type having a guide ring assembly pivotally mounted on a portion of the body of the automobile above and behind a seated occupant thereof for guiding the sliding movement of the seat belt from positions adjacent the occupant responsive to forces imposed by a retractor assembly mounted substantially vertically beneath the guide ring assembly on another portion of the vehicle an improved guide ring assembly comprising:
- a body member including a mounting portion for pivotally mounting the body member on an interior portion of the automobile and a guide portion having a first slot formed therethrough substantially alignable with the path of the seat belt to the retractor and having an entrance receiving the seat belt and an exit through which the seat belt passes to the retractor as it retracts from the occupant restraining position, the slot being closely sized to the thickness of the seat belt; and
- a cover member carried on the body in overlying fashion and having an edge portion positioned adjacent to and overlying only the exit of the slot.

27. In a seat belt system for an automobile of the type having a guide ring assembly pivotally mounted on a portion of the body of the automobile above and behind a seated occupant thereof for guiding the sliding movement of the seat belt from positions adjacent the occupant responsive to forces imposed by a retractor assembly mounted substantially vertically beneath the guide ring assembly on another portion of the vehicle an improved guide ring assembly comprising:
- a body member mounted for pivotal movement on an interior portion of the body of the automobile and including means for receiving the seat belt for passage therethrough;

a cup-like cover member carried in overlying fashion on the body member;

primary anti-twist means formed integrally with the body member for smoothing the seat belt during passage through the guide ring assembly; and secondary anti-twist means formed integrally with the cover member for smoothing the seat belts and positioned in the path of the seat belts from the primary anti-twist means to the retractor.

* * * * *